United States Patent
Lim et al.

(10) Patent No.: US 7,990,123 B2
(45) Date of Patent: Aug. 2, 2011

(54) DCDC CONVERTER WITH SOFT-STARTUP AND SOFT-TRANSITION FOR ADJUSTABLE OUTPUT VOLTAGE

(75) Inventors: Teik Kai Lim, Singapore (SG); Ulysses Ramos Lopez, Singapore (SG)

(73) Assignees: Panasonic Corporation, Osaka (JP); Panasonic Semiconductor Asia Pte. Ltd., Singapore (SG)

( * ) Notice: Subject to any disclaimer, the term of this patent is extended or adjusted under 35 U.S.C. 154(b) by 565 days.

(21) Appl. No.: 12/057,757

(22) Filed: Mar. 28, 2008

(65) Prior Publication Data

US 2009/0243579 A1    Oct. 1, 2009

(51) Int. Cl.
G05F 1/40    (2006.01)
(52) U.S. Cl. ......................... 323/283; 341/152
(58) Field of Classification Search .......... 323/280–288; 219/216, 497, 543, 469, 486; 327/539, 543; 375/238; 341/152
See application file for complete search history.

(56) References Cited

U.S. PATENT DOCUMENTS

| | | | | |
|---|---|---|---|---|
| 4,810,948 A * | 3/1989 | Takuma | | 323/280 |
| 5,675,352 A * | 10/1997 | Rich et al. | | 345/89 |
| 5,982,161 A * | 11/1999 | Nguyen et al. | | 323/284 |
| 2003/0095422 A1 | 5/2003 | Nagaki et al. | | |
| 2005/0116692 A1 | 6/2005 | Sugiyama et al. | | |
| 2006/0197516 A1 | 9/2006 | Chiu et al. | | |
| 2007/0247124 A1 | 10/2007 | Mihashi | | |
| 2007/0247340 A1 | 10/2007 | Tada | | |
| 2007/0290914 A1 | 12/2007 | Matsushita et al. | | |

* cited by examiner

*Primary Examiner* — Rajnikant B Patel
(74) *Attorney, Agent, or Firm* — Greenblum & Bernstein, P.L.C.

(57) ABSTRACT

A method and exemplary apparatus that incorporate soft-start circuit together with adjustable output voltage control are introduced. By implementing a gradual increment of voltage steps/fast decrement, it can totally eliminate overshoot and limit in-rush current significantly at the initial startup and output voltage transition that happens after startup.

13 Claims, 13 Drawing Sheets

Fig.3

STEP 1

USER SELECTS NEW DCDC OUTPUT SETTING. — 100

STEP 2

INCREMENT / DECREMENT BLOCK (IN 104) IS ACTIVATED THAT PRODUCES SMALL VOLTAGE INCREMENTS / FAST DECREMENT UNTIL THE DESIRED VOLTAGE LEVEL IS ACHIEVED. — 101

DCDC CONVERTER WITH SOFT-STARTUP AND SOFT-TRANSITION FOR ADJUSTABLE OUTPUT VOLTAGE

BACKGROUND OF THE INVENTION

1. Field of Invention

The present invention relates to all kinds of switching power supply with variable output voltage.

2. Description of Related Art

In power supply circuit, non-isolated switching regulator having an inductor is used because of high efficiency. Hence it is suitable in many applications, for example, portable devices (mobile phone or mp3 player) or large electronic devices (LCD TV, home theatre system).

However to design a good switching regulator, there are many considerations need to be taken care of. One of such consideration is how to startup a switching regulator. Without proper startup method, output voltage will have large overshoot and in-rush current that is used to charge up output capacitor will be very big. It can destroy the IC or external components. Common countermeasure for this issue is solved by adding a soft-start circuit during the initial startup. Soft-start circuit is able to generate a slow ramping voltage hence slowly increase the output voltage to the required value. This slow ramping voltage can be either connected to input of PWM comparator or acting as a reference voltage for error amplifier. This can prevent large overshoot and limit in-rush current. US Patent Application No. 2006/0197516 A1 (FIG. 1) describes how it can avoid in-rush current by using a reference voltage generator which causes the reference voltage to be gradually increased at the initial stage of the activation of the switching regulator.

However some switching regulators have variable output voltages. Some problems related to such switching regulators are: Overshoot and large in-rush currents can occur when output voltage is changed from a low to a high voltage. Conventional soft-start circuit does not operate after the switching regulator has been powered up. Therefore it cannot provide protection when there is a change in output voltage (from low to high) after initial startup.

The problems faced by such switching regulators voltage can be prevented. US Patent Application No. 2005/0116692 A1 (FIG. 2A) uses a reference voltage generator to generate reference voltage in an increasing step-wise manner to increase output power voltage in a similar step-wise manner to a desired value; and similarly, to decrease the reference voltage to decrease the output power voltage. This method is able to reduce overshoot of output voltage but not completely. This is because the reference voltage increases in a step by step manner. Referring to FIG. 2B, at the beginning of each step increment, there will always be large rush current and overshoot. Hence overshoot cannot be totally eliminated and rush current can still be significantly large.

It is intended for the present invention to solve those problems mentioned. For the present invention, a method to incorporate soft-start circuit together with adjustable output voltage control to eliminate the overshoot and limit in-rush current is disclosed.

SUMMARY OF THE INVENTION

The purpose of this invention is to provide a method that incorporate soft-start circuit together with adjustable output voltage control. At the same time, it can totally eliminate overshoot and limit in-rush current significantly at the initial startup and output voltage transition that happens after startup.

A switching regulator will include 1 switching transistor with 1 diode for non-synchronous switching or 2 switching transistors for synchronous switching, energy storage elements (inductor and capacitor), PWM comparator, error amplifier, oscillator and reference voltage generator.

Connection of switching transistors and energy storage elements depends on the topology (for example step-up, step-down or up-down topology). Error amplifier will amplify the difference between output voltage (feedback) and reference voltage. PWM comparator compares the output of error amplifier with a saw-tooth or triangle wave and a generate PWM signal that control the switching transistors. Output voltage of switching regulator is determined by reference voltage. To prevent rush current and overshoot during initial startup, reference voltage at the input of error amplifier is ramped up slowly. Output voltage of the regulator will also ramp up slowly following the reference voltage.

When there is a need for adjustable voltage, either feedback resistor value or reference voltage is changed. For this invention, changing the reference voltage is a better option because soft-start circuit and reference voltage generator for different output voltage can be implemented together.

During startup, reference voltage is increased in a step by step manner until it reaches the required reference voltage that determines the output voltage. If output voltage is high, there will be more steps. If output voltage is low, there will be fewer steps. Each step increment size is determined by many factors, for example, input voltage, output voltage difference, inductor value etc. With these factors known, each step increment can be pre-determined.

When there is a need to increase output voltage after initial startup, reference voltage will be increased. But it will not increase to the required voltage in just 1 step. It will increase step-by-step following the same increment step size as the soft-start during initial start-up. Hence rush current and overshoot are limited just like initial startup condition.

However if sharp step increment is used (regardless of initial startup or voltage change that happens after startup), it will cause sudden increase in duty cycle which create large rush current during the instant sharp rise. Most of the time, rush current is large enough to cause significant overshoot. To solve this problem, it is possible to use much smaller step size but it also means that it will take more steps to reach to the required output (circuit size will become larger and soft-start timing will increases).

By adding an internal capacitor (pF range) to the reference voltage generator block, it can enhance the performance by creating a slow increment (either linearly or exponentially) instead of a sharp step increment. Soft step increment will reduce rush current and overshoot to the minimum.

BRIEF DESCRIPTION OF THE DRAWINGS

FIG. 3 is a block diagram showing the method used according to the present invention.

DETAILED DESCRIPTION OF THE PREFERRED EMBODIMENTS

FIG. 3 shows one example of a method to incorporate soft-start circuit together with adjustable output voltage control according to the present invention. The current invention comprises a two step method as described below.

Step 1 (100) is an input determined by the user which translates to a particular DCDC output level. The input may be to a DAC (digital-to-analog converter or any interface that serves the following function: to set a DCDC output voltage based on a corresponding pre-set input setting). Step 2 (101) is a method that generates small voltage increments in a pre-determined voltage step-wise manner (for low to high voltage transitions) or a fast one-step decrement (for high to low voltage transitions). The voltage increments shall continue on a regular time interval until the desired voltage level, as determined in Step 1, is achieved. Decrement will be fast since there is no need for multi-step decrements.

Figure 1:
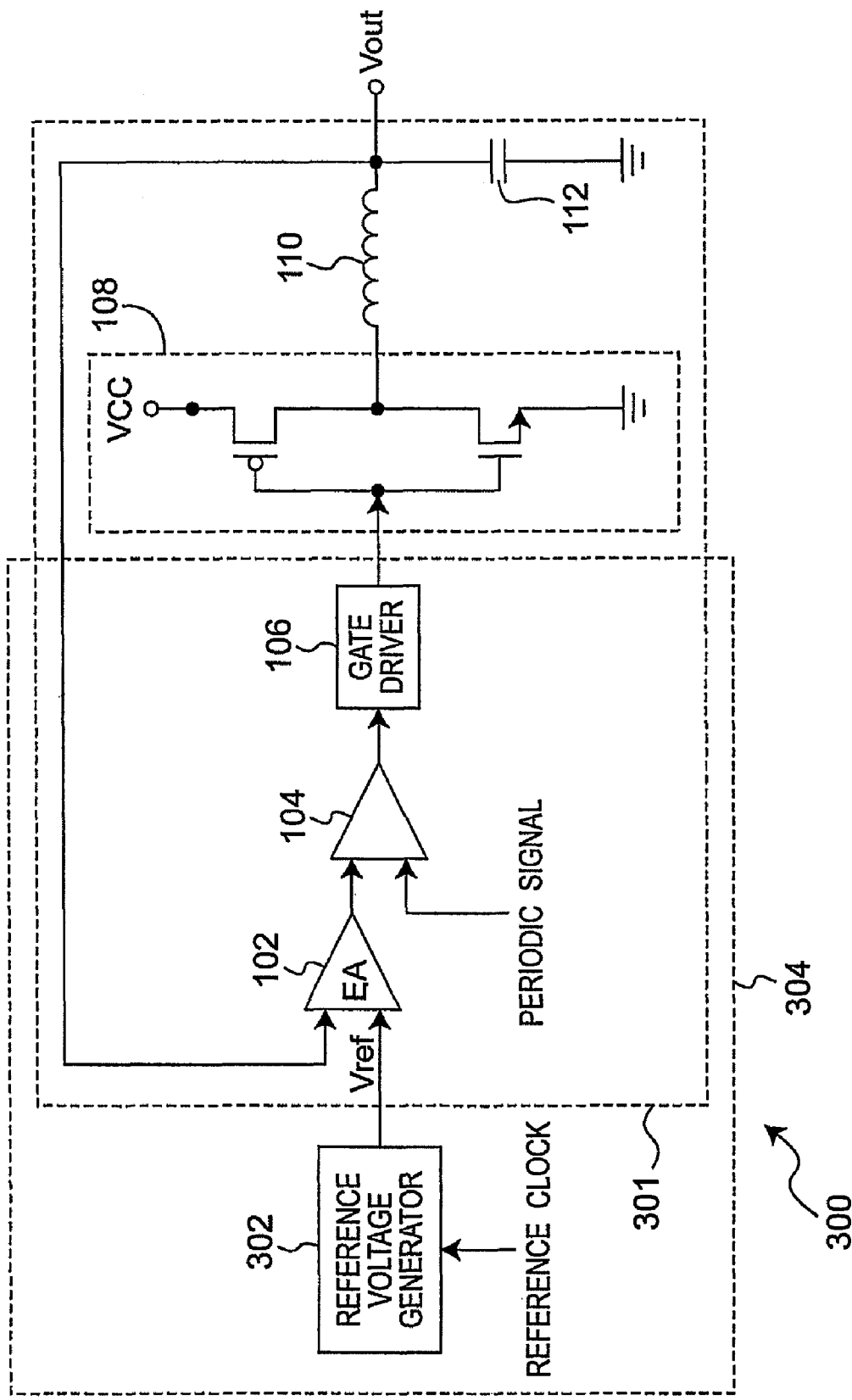
FIG. 1 is a block diagram showing one example of a prior art of the soft start method.
Figure 2A:
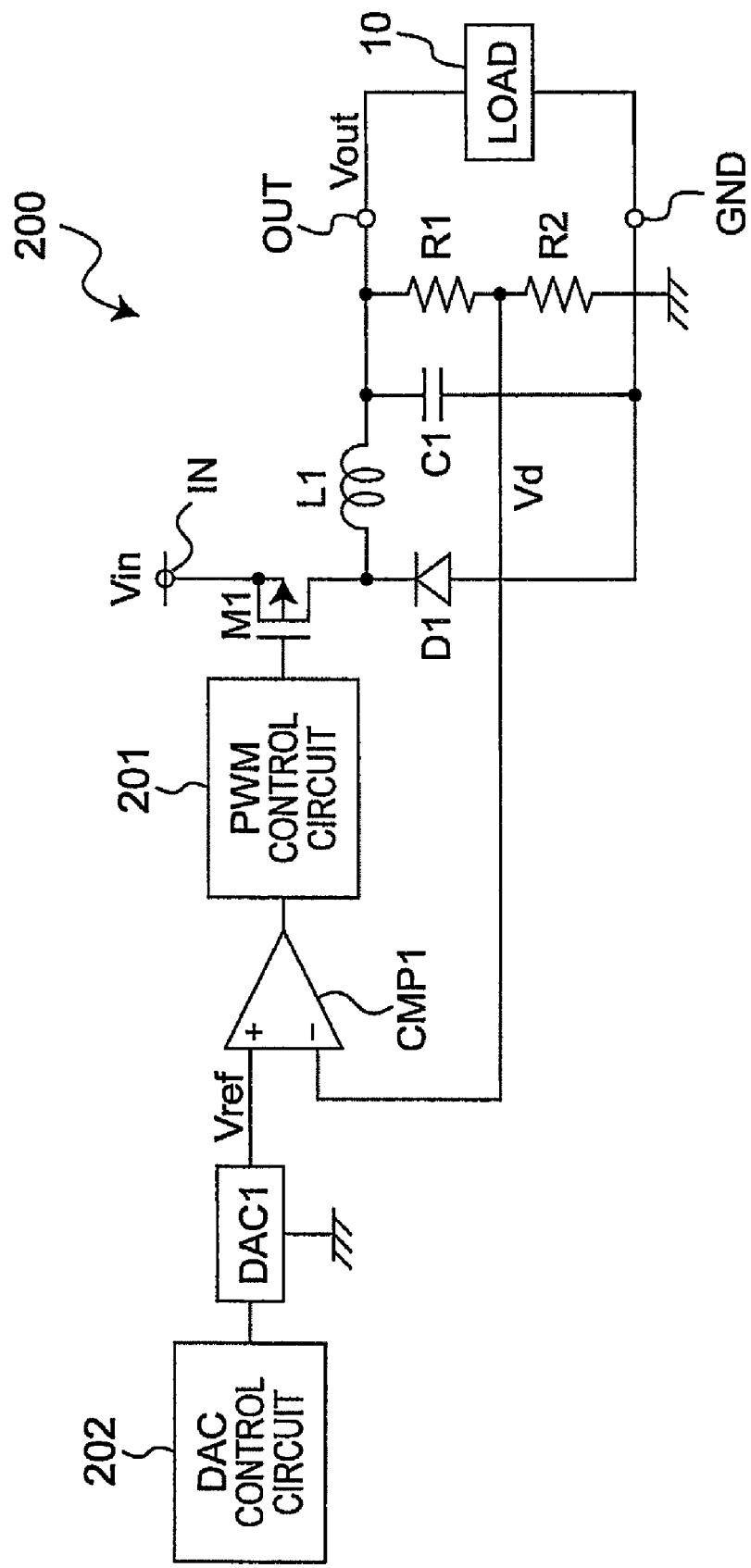
FIG. 2A is a block diagram showing one example of another prior art with a step-wise incrementing function.
Figure 2B:
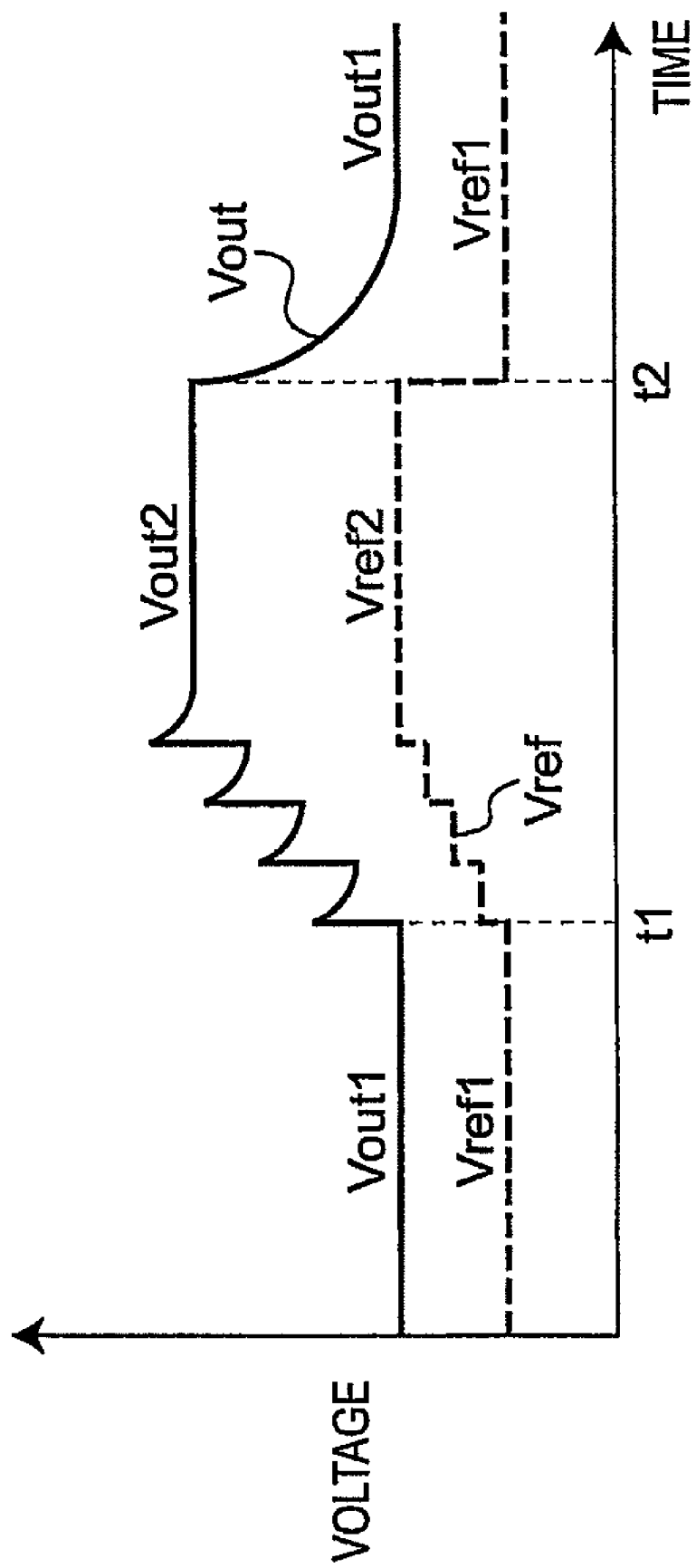
FIG. 2B are waveforms showing the resultant waveforms based on prior art.
Figure 4:
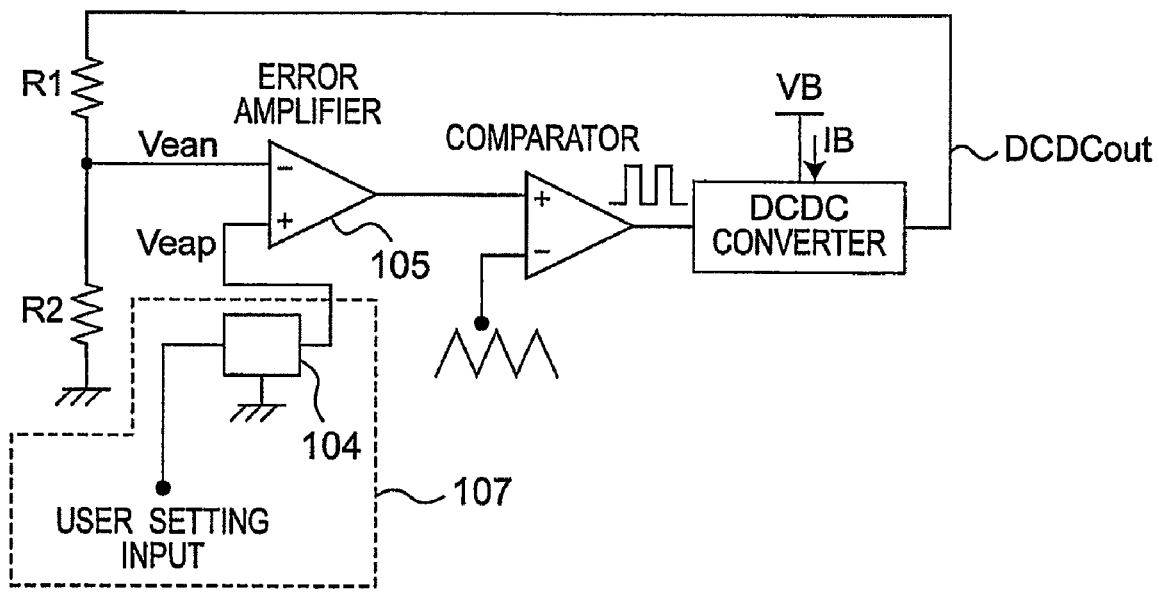
FIG. 4 is a block diagram showing one example of implementation of method, according to the present invention.

FIG. 4 shows an example of a block representation 105 of an example of the method described, relative to a switching regulator system.

Figure 5:
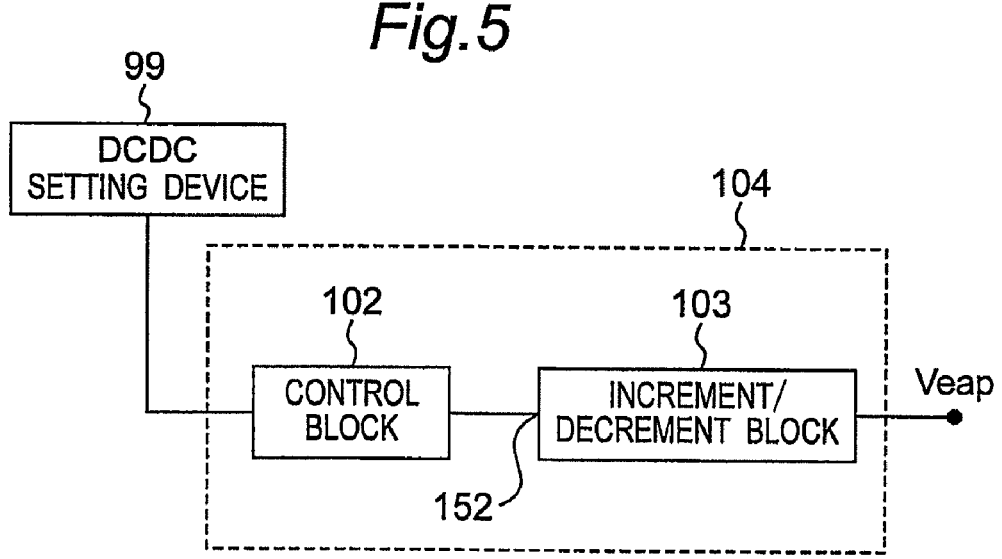
FIG. 5 is a block diagram showing an example of the components constituting the implementation of method, according to the present invention.

FIG. 5 shows an example to realize the method as described in FIG. 3. Upon receiving a user input setting, a DCDC setting device 99 selects and produces a new DCDC output voltage level, Control Block 102 automatically sends an enabling signal to the Block Enable pin 152 of Increment and Decrement Block 103.

Figure 6:
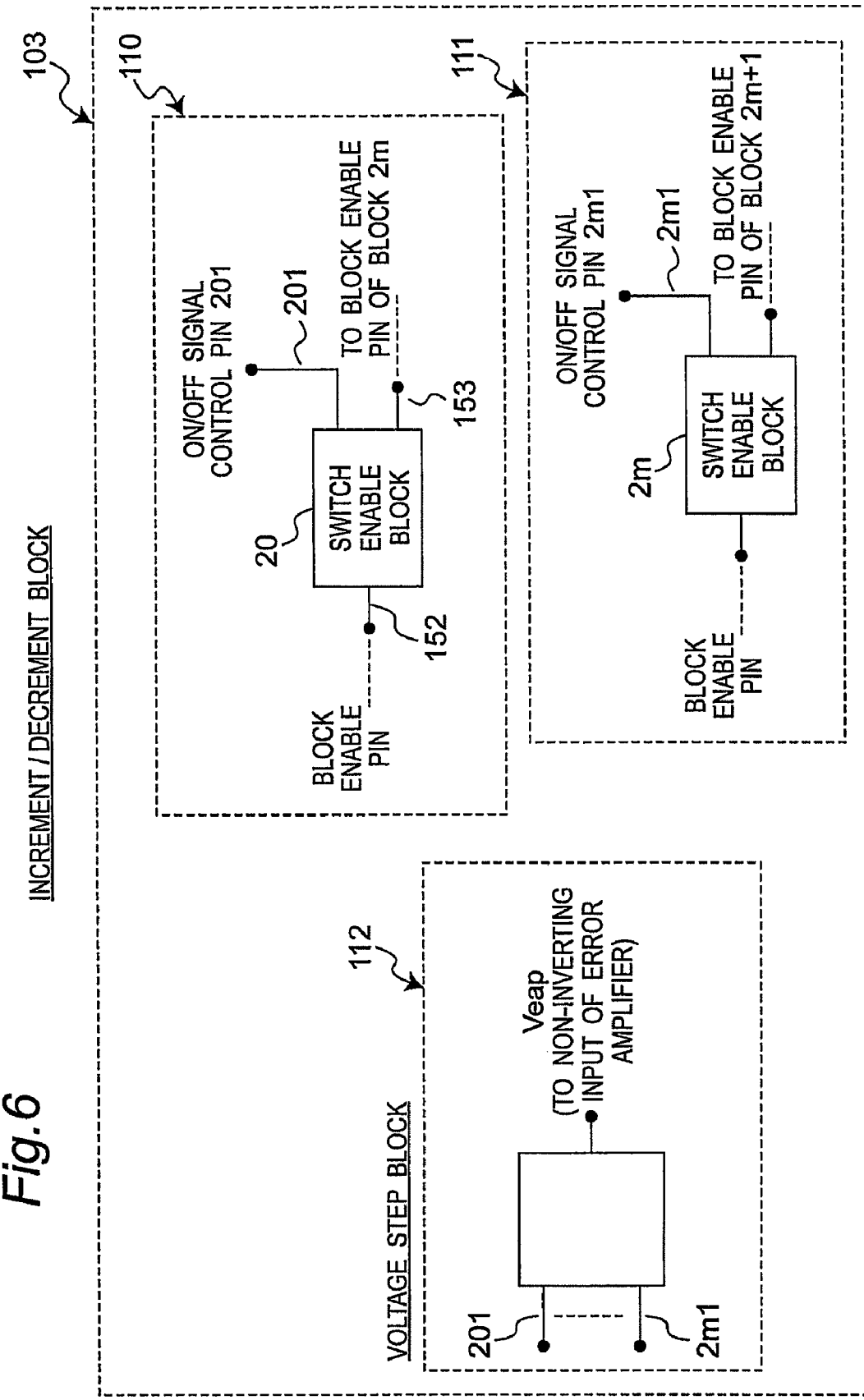
FIG. 6 is a block diagram showing an example of the increment and decrement block, according to the present invention.

An example of implementation of the Increment and Decrement Block 103 is as shown in FIG. 6. Block 103 typically comprises of 2 main blocks: (1) Voltage Step Block 112 and (2) Switch Enable Block 110. The Voltage Step Block 112 essentially has n numbers (where n is a positive non-zero integer) of control pins 201, 211, . . . , 2m1, . . . , 2n1 as inputs and Veap as its output, where Veap is the non-inverting input of the Error Amplifier 105 of a switching regulator system. Switch Enable Block 110 has as its input, a Block Enable pin 152 and 2 outputs, namely a control pin 201 that connects to input 201 of Block 112, and output pin 153, connected to the Block Enable pin of the next Switch Enable Block 110A.

Switch Enable Block 2m (110M) is one of n numbers of Switch Enable Blocks arranged in series to each other, with 2m representing $m^{th}$ block in the series, (where $m \epsilon Z^+$, where $Z^+ = \{0, 1, 2, \ldots\}$).

Hence, similarly, Switch Enable Block 110A, which is in series with Switch Enable Block 110, has as its input, a Block Enable pin 106A and 2 outputs, namely a control pin 211 that connects to input 211 of Block 112, and output pin 113A, connected to the Block Enable pin of the next Switch Enable Block in the series. Similar input and output notation format and connectivity applies up to Switch Enable Block 110N, the last block in the series. Being the last Switch Enable Block, it has only 1 output, that is, a control pin 2n1 that connects to input 2n1 of Block 112.

For generality, we shall name a typical Switch Enable Block as Switch Enable Block 2m, shown as Switch Enable Block 110M in FIG. 6.

Next, the operation of such an arrangement is described below.

Figure 7:
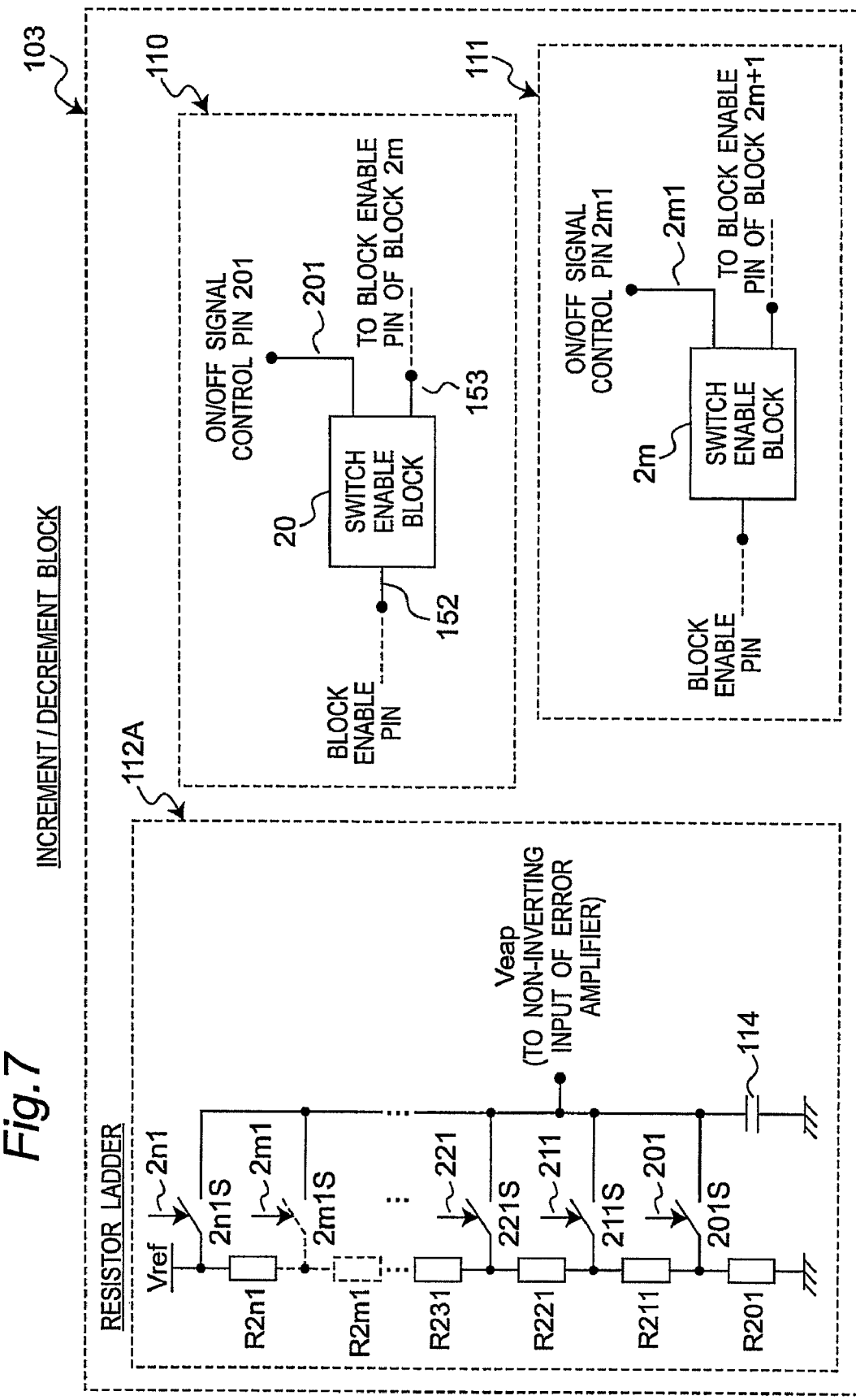
FIG. 7 is one example of the voltage step block, according to the present invention.

An example of the Increment and Decrement Block with an example of the voltage step block 112 is as shown in FIG. 7. Here, block 112 is realized using a resistor ladder 112A. The resistor ladder comprises of an n (where $n \epsilon Z^*$ where $Z^* = \{1, 2, \ldots\}$) number of resistors connected in series between a reference voltage Vref and ground level. At every resistor node, except the node connected to ground, is connected a control switch 2m1S (where $m \epsilon Z^+$ where $Z^+ = \{0, 1, 2, \ldots\}$), to be activated by control pin 201. The other terminals of the switches 2m1S are shorted together to form the output Veap. This output node is connected to one of the terminals of capacitor 114, whose other terminal is connected to ground.

For the case where the switching amplifier has just turned on, the following steps will take place.

For the first block in the series, identified as Switch Enable Block 20 (110), it will receive an enabling input via the Block Enable pin 152. Block 20 (110) will in turn send an ON signal via control pin 201, causing corresponding switch 201S to close. Hence, the resulting voltage level at Veap:

$$Veap = \{(R201 + R202 + \ldots + R2m1)/ \sum R\} \times Vref$$
$$= \{R201/ \sum R\} \times Vref$$

Upon the closing of switch 201S, capacitor 114 is charged up from initial ground voltage until a stable Veap voltage is achieved. This capacitor 114 provides a non-abrupt step increment.

Veap, being connected to the non-inverting input+ which the inverting input, Vean, of Amplifier 105 is compared with and targeted to achieve, where:

$$Vean = \{R2/(R2+R1)\} \times DCDCout$$

Hence, this translates to achieving a first DCDCout level denoted by:

$$DCDCout = Vean/\{R2/(R2+R1)\}$$

If the preset default DCDCout level corresponds to the closing of switch 2m1S, then control pin 201 will be deactivated such that switch 201S will be open. Next, Block Enable pin 153 will send an enabling signal to Block Enable pin of the next Switch Enable Block in series, that is, Switch Enable block 21 in this case. Control pin 211 of block 21 will in turn close switch 211S, hence achieving the next DCDCout level. The sequence of activating and deactivating continues until finally, block $2m$ is enabled and control pin $2m1$ closes switch $2m1S$. Thus the targeted preset default DCDCout level upon circuit startup is achieved.

Figure 8:
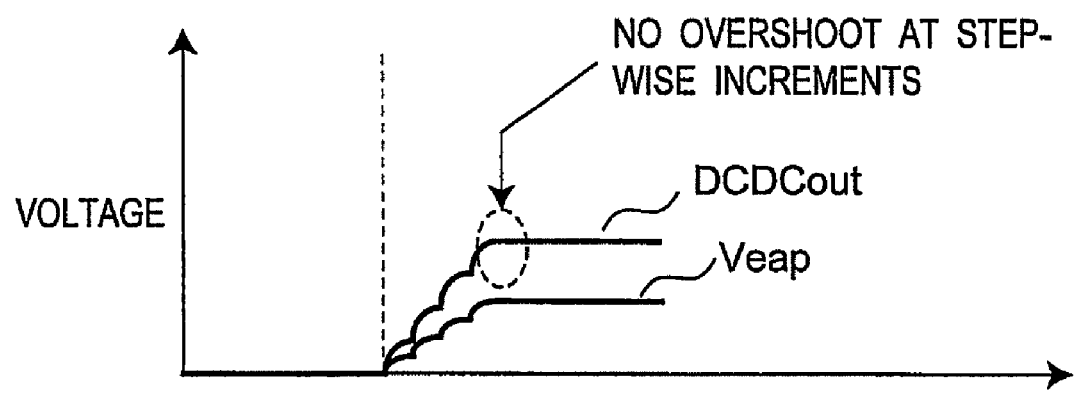
FIG. 8 shows resultant waveforms as obtained from the exemplary implementation, according to the present invention. This is for the case of initial condition being the circuit turn-on condition.

FIG. 8 shows the gradual stepwise increments of Veap and its corresponding DCDCout voltage level. Notice that there is no overshoot based on the configuration of the current invention.

For the case where the switching amplifier is currently at an arbitrary output level corresponding to the activation of control pin $2m1$. When the user makes a new 'User Setting Input', the following steps will take place.

For case where:

New DCDCout level=Current DCDCout level, control pin $2m1$ will remain activated.

For case where:

New DCDCout level>Current DCDCout level,
the steps similar to that described in the previous section will take place, namely:

Control pin $2m1$ will be deactivated, control pin $2(m+1)1$ will be activated, closing switch $2(m+1)1S$. After a pre-determined delay time, control pin $2(m+1)1$ will be deactivated, and control pin $2(m+2)1$ will be activated, closing switch $2(m+2)1S$ instead. Correspondingly, Veap increases as well, resulting in DCDCout increasing also. The sequence of activating and deactivating will continue until the control pin of the desired output level is activated.

Figure 9:
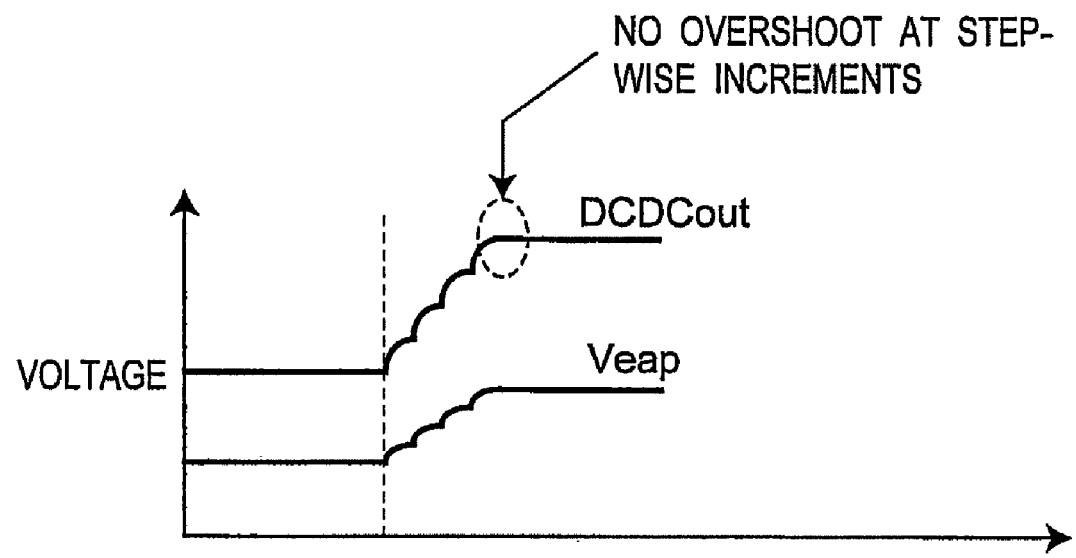
FIG. 9 shows resultant waveforms as obtained from the exemplary implementation, according to the present invention. This is for the case of initial condition being a current output voltage, and incrementing upwards.
Figure 10:
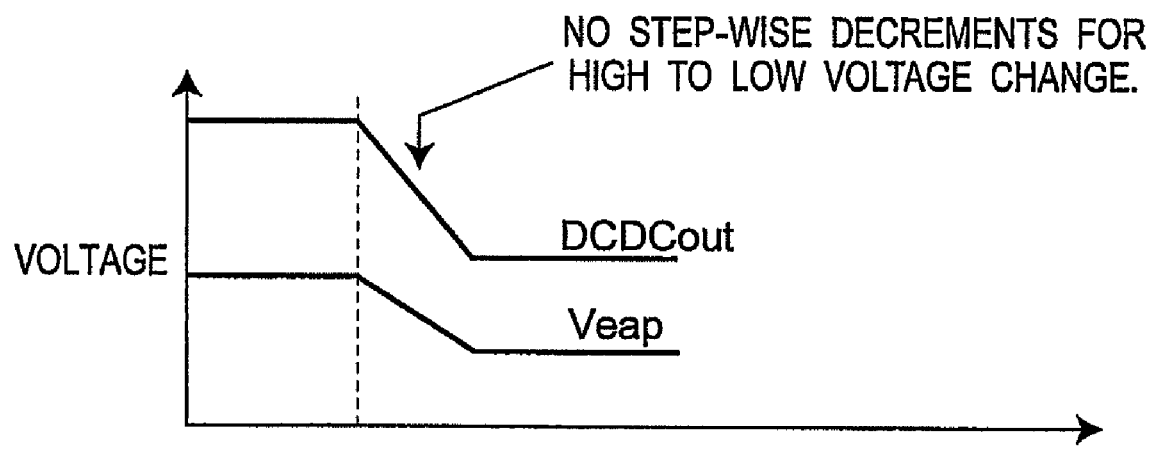
FIG. 10 shows resultant waveforms as obtained from the exemplary implementation, according to the present invention. This is for the case of initial condition being a current output voltage, and changes to a new lower voltage.

FIG. 9 shows the gradual stepwise increments of Veap and its corresponding DCDCout voltage level. Notice that there is no overshoot based on the configuration of the current invention.

Figure 11A:
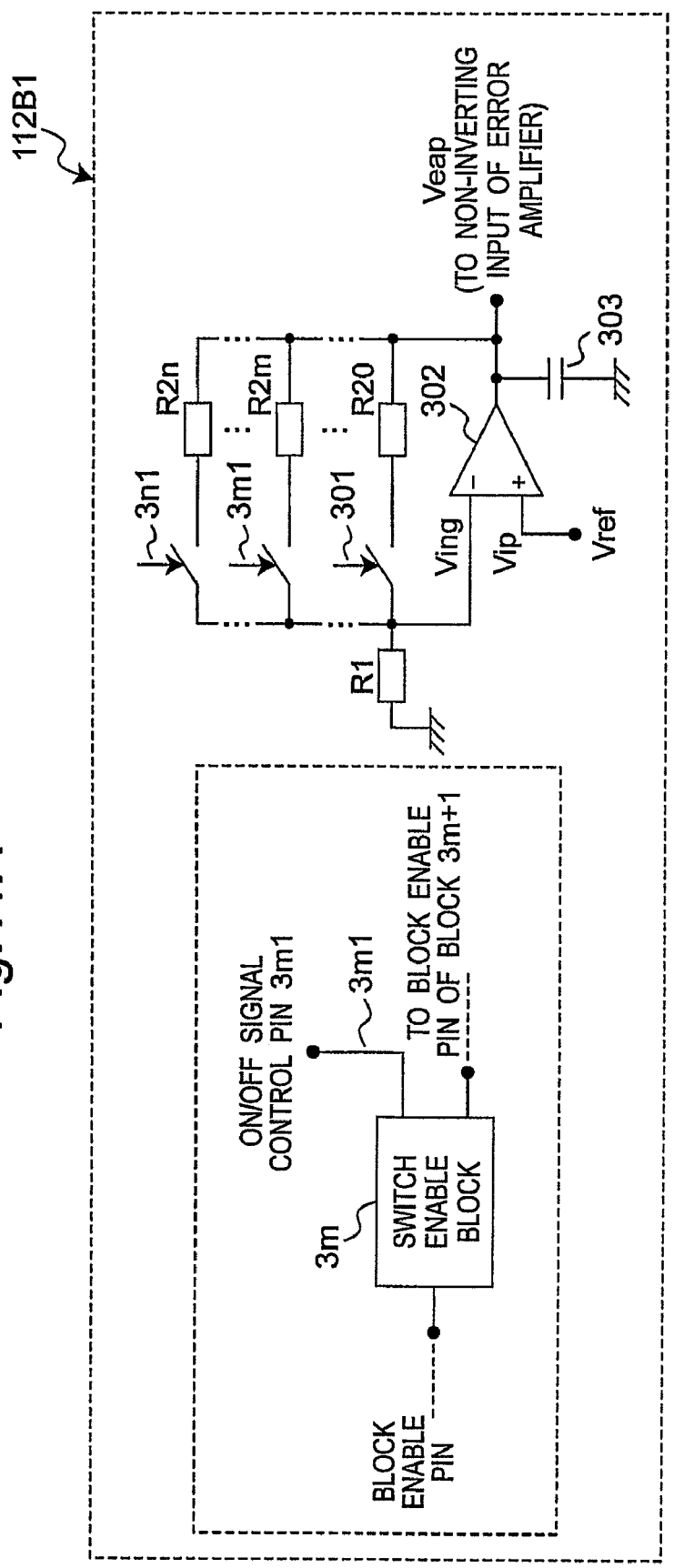
FIG. 11A is yet another example of the voltage step block, according to the present invention.

For case where:

New DCDCout level<Current DCDCout level,
the steps similar to that described in the previous section will take place, namely:

FIG. 11A shows another example of a Voltage Step Block 112B1 as part of the Increment and Decrement Block 103. Here, a non-inverting amplifier configuration is used. The non-inverting input terminal, Vip, of amplifier 302 is applied a pre-determined reference voltage, Vref. The inverting input, Ving, of amplifier 302 is connected to one terminal of resistor R1, whose other terminal is connected to ground. Connected to Ving are several series-connected switch $3m1$ and resistor $R2m$ pairs connected in parallel to each other. One terminal of the control switches are shorted together and connected to Ving, while the other terminal is connected to one of the terminals of their respective resistor pair. The other terminal of the resistors are shorted together and connected to the output terminal of amplifier 302. Capacitor 303 has one of its terminals connected to the output of amplifier 302 as well, while its other terminal is grounded. The output of the amplifier 302 is denoted as Veap.

Switch Enable Block $3m$ [310M] is the same as Switch Enable Block $2m$ (110M), that is, Switch Enable Block $3m$ (310M) is one of n numbers of Switch Enable Blocks arranged in series to each other, with $3m$ representing $m^{th}$ block in the series, (where $m \epsilon Z^+$, where $Z+=\{0, 1, 2, \ldots\}$). Likewise, the input and output notation format and connectivity apply in the same way as for the Switch Enable Block 110 series.

The sequence of operation of Voltage Step Block 112B1 is as follows: Upon receiving a control signal to close a particular switch $3m1$, output Veap is outputted, where:

$$Veap=\{1+(R2m/R1)\} \times Vref$$

(where $m \epsilon Z^+$ where $Z^+=\{0, 1, 2, \ldots\}$)

Resistors R20<R21< ... <R2m< ... <R2n (where m, $n \epsilon Z^+$ where $Z^+=\{0, 1, 2, \ldots\}$), and that (R21-R20)=(R22-R21)= ... =(R2n-R2(n-1)). Similar to the sequence described for 112A, switches $3m1$ are closed, selecting to connect to the appropriate resistor corresponding to the voltage level required. The larger the resistor value connected, the higher the voltage level is achieved.

Another example of operation of Voltage Step Block 112B1 is as follows:
Resistors R20=R21= ... =R2m= ... =R2n.
Hence, output voltage of amplifier 302:

$$Veap=\{1+(R20//R21// \ldots //R2m)/R1\} \times Vref$$

Figure 11B:
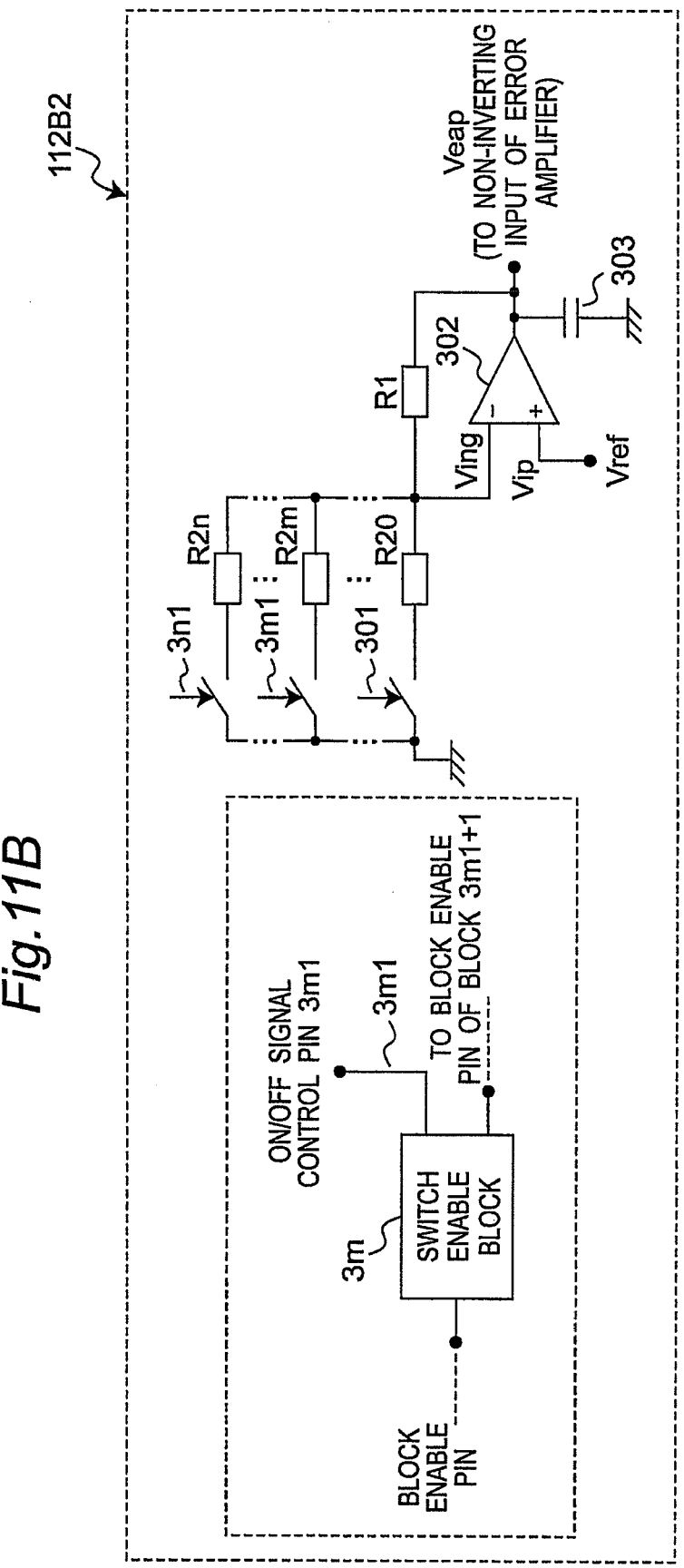
FIG. 11B is yet another example of the voltage step block, according to the present invention by slight modification of the embodiment described in FIG. 11A.

It can be observed that the more switches closed, the smaller is Veap. Hence, for initial condition, all the switches are closed. A step-wise increment of Veap is achieved by opening one switch at a time until the required voltage level is achieved. Likewise, as shown in a Voltage Step Block 112B2 of FIG. 11B, the step-wise effect may also be implemented by interchanging the positions of the switch-resistor array with resistor R1. The corresponding value for Veap will thus be:

$$Veap=\{1+(R1/(R20//R21// \ldots //R2m))\} \times Vref$$

Figure 12:
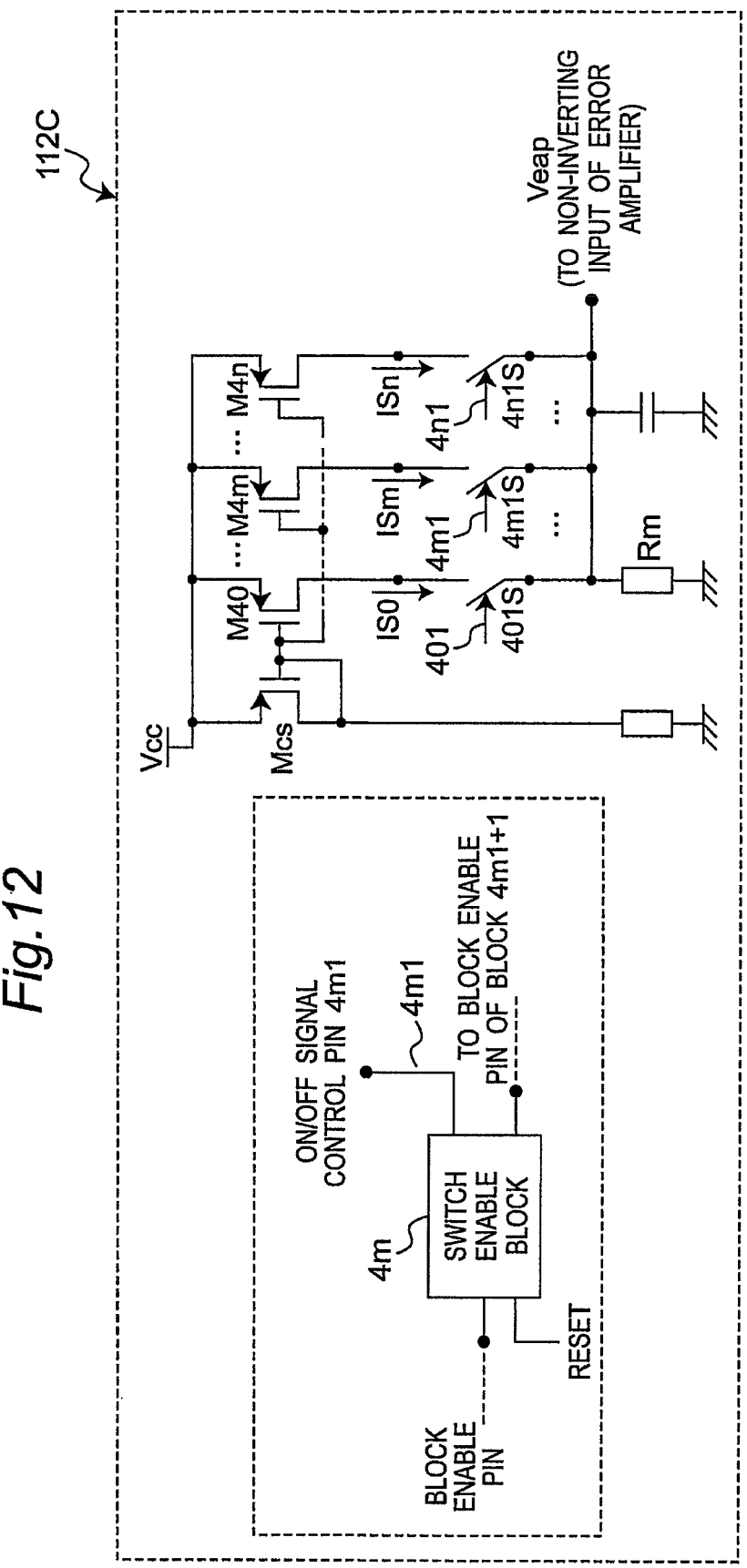
FIG. 12 is yet another example of the voltage step block, according to the present invention.

FIG. 12 shows another example of a Voltage Step Block 112C as part of the Increment and Decrement Block 103. Here, PMOS M40, ..., M4n mirror current from a current source Mcs.

The output voltage of 112C is given by:

$$Veap=(IS0+IS1+ \ldots +ISm) \times Rm$$

Switch Enable Block $4m$ (410M) is the same as Switch Enable Block $2m$ (110M), that is, Switch Enable Block $4m$ (410M) is one of n numbers of Switch Enable Blocks arranged in series to each other, with $3m$ representing $m^{th}$ block in the series, (where $m \epsilon Z^+$, where $Z^+=\{0, 1, 2, \ldots\}$). Likewise, the input and output notation format and connectivity apply in the same way as for the Switch Enable Block 110 series.

For initial condition, all the switches are open. When the first Switch Enable Block 40 sends a signal via control pin 401 to close switch 401S, the first DCDCout level is thus obtained. To step-up to a higher DCDCout voltage level, subsequent Switch Enable blocks $4m$ (where $m \epsilon Z^+$ where $Z^+=\{0, 1, 2, \ldots\}$) will be enabled and respective control pins $4m1$ closing the corresponding switches $4m1S$. The only difference with the sequence for 112A is that when a subsequent switch $4m1S$ is closed, the previous switches will not be open. That is, all switches from 401S to $4m1S$ will be closed and remain closed. When the user selects a new DCDCout level, switches $4(m+1)S$, $4(m+2)S$, ... will be closed to achieve a higher new output level; or switches $4(m-1)S$, $4(m-2)S$, ... will be open to achieve a lower new output level.

Figure 13:
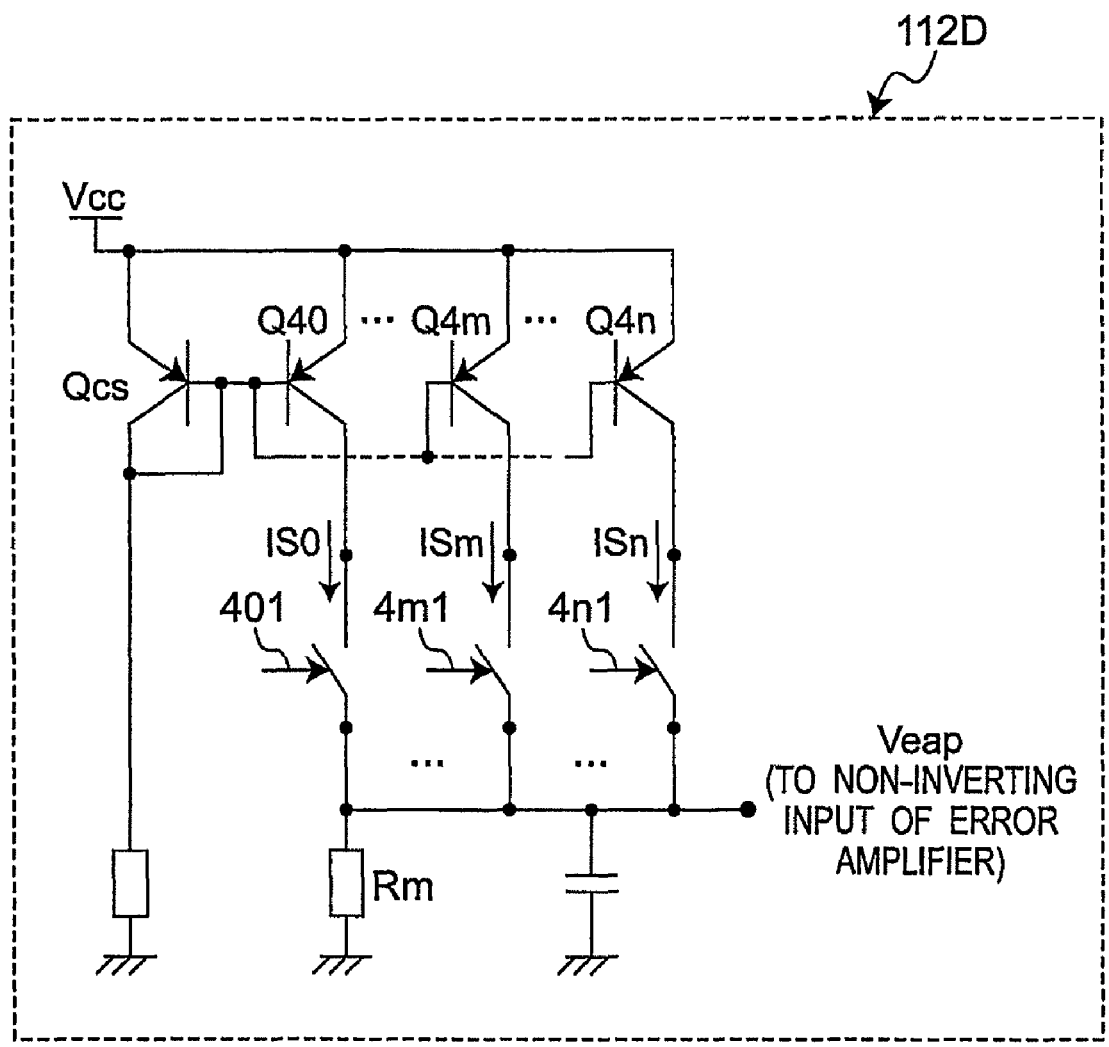
FIG. 13 is another example of the voltage step block, according to the present invention.

Referring to FIG. 13, instead of PMOS M40, ..., M4n and Mcs, the circuit may use PNP transistors Q40, ..., Q4N and Qcs. The above-described disclosure of the invention in terms of the presently preferred embodiments is not to be interpreted as intended for limiting. Various alterations and modifications will no doubt become apparent to those skilled in the art to which the invention pertains, after having read the disclosure. As a corollary to that, such alterations and modifications apparently fall within the true spirit and scope of the invention. Furthermore, it is to be understood that the appended claims be intended as covering the alterations and modifications.

What is claimed is:

1. A DC-DC converter, comprising:
  a plurality of resistors connected in series;
  a voltage source connected to an end of the plurality of resistors;
  a plurality of switches connected to said plurality of resistors, a first end of each of the plurality of switches connected to a first end of a corresponding resistor in the plurality of resistors;
  a voltage output terminal connected to a second end of each of the plurality of switches;
  a capacitor coupled to the voltage output terminal;
  a target voltage generator that sets a target voltage; and
  a controller coupled to each of the plurality of switches, the controller sequentially applying turn-on pulses to the plurality of switches to produce an output voltage at the voltage output terminal that gradually increases in a step-wise manner until the output voltage corresponds to the target voltage.

2. A DC-DC converter, comprising:
  a plurality of resistor-switch pairs connected in parallel between a first junction and a second junction, each of the plurality of resistor-switch pairs including a resistor and a switch connected in series;
  an amplifier including an inverting input connected to the first junction, a non-inverting input, and an amplifier output connected to the second junction;
  a reference voltage generator connected to the non-inverting input;
  a voltage output terminal connected to the amplifier output;
  a capacitor coupled to the voltage output terminal;
  a target voltage generator which sets a target voltage; and
  a controller coupled to the switch of each of the plurality of resistor-switch pairs, the controller sequentially applying turn-on pulses to the switch of the plurality of resistor-switch pairs to produce an output voltage at the voltage output terminal that gradually increases in a step-wise manner until the output voltage corresponds to the target voltage.

3. A DC-DC converter according to claim 2, wherein a resistance of the resistor of each of the plurality of resistor-switch pairs is the same.

4. A DC-DC converter according to claim 3, wherein a first turn-on pulse of the switch of one of the plurality of resistor-switch pairs overlaps with a second turn-on pulse of the switch of an other of the plurality of resistor-switch pairs.

5. A DC-DC converter according to claim 2, wherein a resistance of the resistor of each of the plurality of resistor-switch pairs is different.

6. A DC-DC converter according to claim 5, wherein a first turn-on pulse of the switch of one of the plurality of resistor-switch pairs does not overlap with a second turn-on pulse of the switch of an other of the plurality of resistor-switch pairs.

7. A DC-DC converter, comprising:
  a plurality of resistor-switch pairs connected in parallel between a first junction and a second junction, each of the plurality of resistor-switch pairs including a first resistor and a switch connected in series, the first junction being connected to a ground;
  an amplifier having an inverting input connected to the second junction, a non-inverting input, and an amplifier output;
  a second resistor connected between the inverting input and the amplifier output;
  a reference voltage generator connected to the non-inverting input;
  a voltage output terminal connected to the amplifier output;
  a capacitor coupled to the voltage output terminal;
  a target voltage generator that sets a target voltage; and
  a controller coupled to the switch of each of the plurality of resistor-switch pairs, the controller sequentially applying turn-on pulses to the switch of the plurality of resistor-switch pairs to produce an output voltage at the voltage output terminal that gradually increases in a step-wise manner until the output voltage corresponds to the target voltage.

8. A DC-DC converter according to claim 7, wherein a resistance of the resistor of each of the plurality of resistor-switch pairs is the same.

9. A DC-DC converter according to claim 8, wherein a first turn-on pulse of the switch of one of the plurality of resistor-switch pairs overlaps with a second turn-on pulse of the switch of an other of the plurality of resistor-switch pairs.

10. A DC-DC converter according to claim 7, wherein a resistance of the resistor of each of the plurality of resistor-switch pairs is different.

11. A DC-DC converter according to claim 10, wherein a first turn-on pulse of the switch of one of the plurality of resistor-switch pairs does not overlap with a second turn-on pulse of the switch of an other of the plurality of resistor-switch pairs.

12. A DC-DC converter, comprising:
  a plurality of transistor-switch pairs connected in parallel between a first junction and a second junction, each of the plurality of transistor-switch pairs including a first transistor and a switch connected in series;
  a current source connected to the first junction;
  a first resistor connected to the second junction;
  a transistor-resistor pair including a second transistor and a second resistor connected in series, the transistor-resistor pair coupled to each of the plurality of transistor-switch pairs to define a plurality of current mirror circuits using the transistor-resistor pair as a reference current generator;
  a voltage output terminal connected to the second junction;
  a capacitor coupled to the voltage output terminal;
  a target voltage generator that sets a target voltage; and
  a controller coupled to the switch of each of the plurality of transistor-switch pairs, the controller sequentially applying turn-on pulses to the switch of the plurality of transistor-switch pairs to produce an output voltage at the voltage output terminal that gradually increases in a step-wise manner until the output voltage corresponds to the target voltage.

13. A DC-DC converter according to claim 12, wherein a first turn-on pulse of the switch of one of the plurality of transistor-switch pairs overlaps with a second turn-on pulse of the switch of an other of the plurality of transistor-switch pairs.

* * * * *